UNITED STATES PATENT OFFICE.

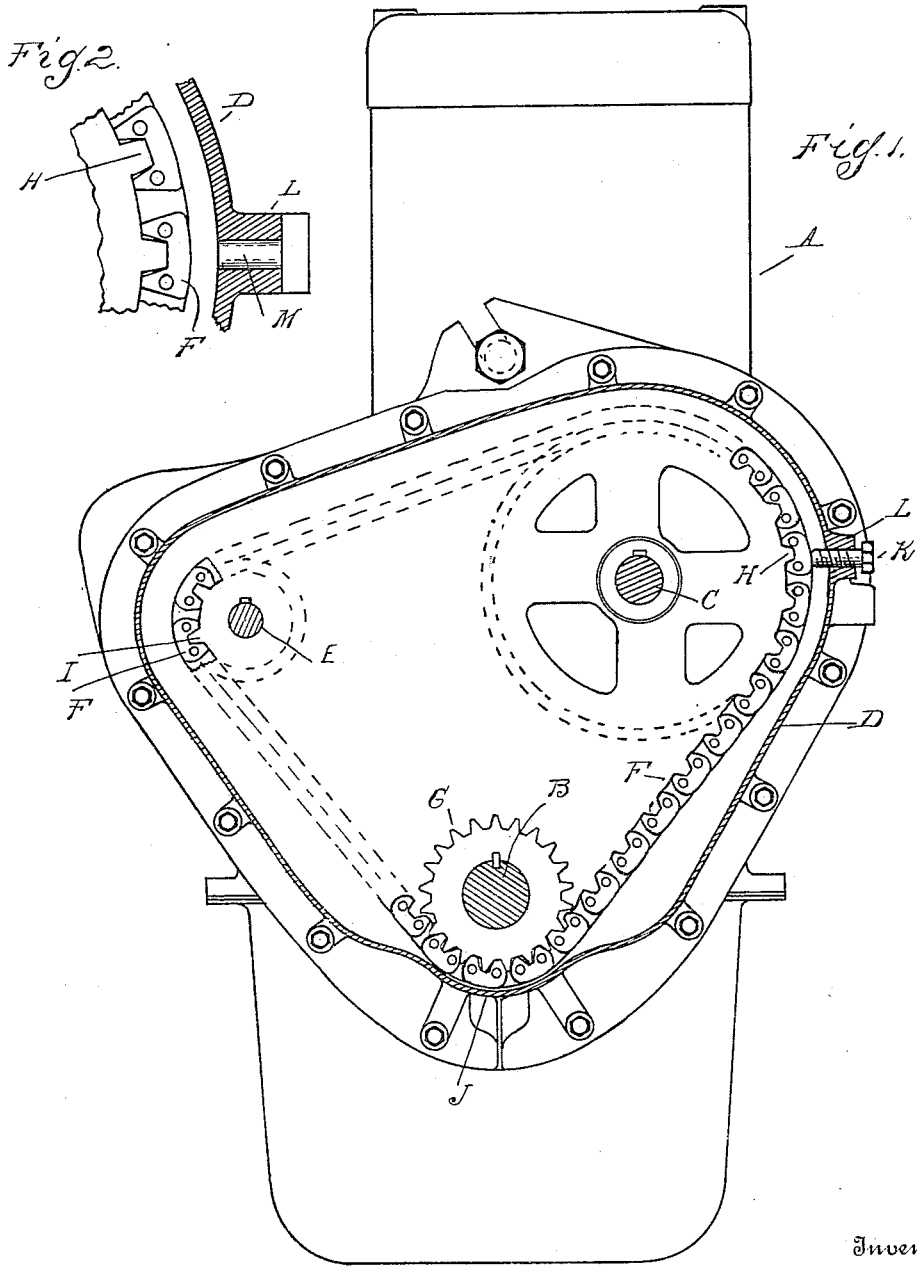

IVAN ORNBERG, OF DETROIT, MICHIGAN, ASSIGNOR TO HUPP MOTOR CAR CORPORATION, OF RICHMOND, VIRGINIA, A CORPORATION OF VIRGINIA.

DRIVE-CHAIN RETAINER.

1,282,118.   Specification of Letters Patent.   Patented Oct. 22, 1918.

Application filed December 14, 1917. Serial No. 207,030.

*To all whom it may concern:*

Be it known that I, IVAN ORNBERG, a citizen of the United States of America, residing at Detroit, in the county of Wayne and State of Michigan, have invented certain new and useful Improvements in Drive-Chain Retainers, of which the following is a specification, reference being had therein to the accompanying drawings.

The invention relates to chain driven mechanism where a plurality of driven sprockets are actuated from the same chain and in which there is a timed relation between the driving and one of the driven sprockets, and more particularly the invention relates to mechanism for driving the cam-shaft of an engine and also driving accessory mechanism, such as the electric generator. It is the object of the invention to facilitate the detachment and replacement of the auxiliary driven mechanism without disturbing the timed relation between the engine and cam-shaft, and to this end the invention comprises the construction as hereinafter set forth.

In the drawings:

Figure 1 is an elevation of the drive mechanism with the inclosing housing therefor in section; and Fig. 2 is a similar view of a portion of the housing.

A is the engine casing, B is the crank-shaft and C is the cam-shaft. D is a housing at one end of said casing for inclosing the chain drive mechanism connecting the crank shaft and cam-shaft, and for also driving the electric generator shaft E. As shown this housing is of substantially triangular shape, the drive chain F passing over sprockets G, H and I respectively on the crank-shaft, cam-shaft and generator shaft.

It is essential to the operation of the engine that the rotation of the crank-shaft and cam-shaft be accurately timed in relation to each other, but there is no necessity for the timed relation between the crank-shaft and generator. It frequently happens that for purpose of repair it is necessary to remove the generator, but where this is done there is danger of disengagement of the drive chain from the crank-shaft and cam-shaft sprockets by which the timed relation therebetween would be lost. I have avoided this difficulty by the provision of locking means for retaining the chain in engagement with the crank-shaft and cam-shaft sprockets when the generator sprocket is removed, the construction being as follows:

The housing E for the chain drive is formed with a portion J adjacent to the chank-shaft sprocket, which is of segmental form concentric with the axis of said sprocket and providing only sufficient clearance to prevent rubbing of the chain from in normal operation but not allowing disengagement of the chain from the sprocket. The sprocket H for the cam-shaft must be initially timed with the crank-shaft, and therefore, sufficient clearance is provided between this sprocket and the adjacent wall of the housing D to permit of engagement and disengagement of the chain. I have, however, provided for the locking of the chain to this sprocket by an adjustable stop or clamp which is normally disengaged or unlocked but may be quickly engaged when required. As shown, a set-screw K passes through a threaded boss L in the housing and is adapted when adjusted inward to bear against one of the links of the chain to clamp the same against the tooth of the sprocket H.

In use, whenever it is desired to remove the generator the set-screw K is first screwed inward into clamping position. This will lock the sprocket H and cam shaft C from movement, while the sprocket G and crank-shaft B are held stationary by the frictional resistance of the pistons and other connected parts. Thus the generator with its sprocket I may be removed and replaced without disturbing the timed relation, and when the parts are re-assembled the screw K is again adjusted outward. To avoid accidental engagement of the screw it is preferably entirely removed and the aperture in the casing closed by a plug M. as shown in Fig. 2.

What I claim as my invention is:

1. The combination with a driving sprocket, a plurality of driven sprockets and a chain for connecting said sprockets, of means for locking the chain to said drive sprocket and one of the driven sprockets to maintain a timed relation therebetween when the other driven sprocket is removed.

2. The combination with a drive sprocket, a plurality of driven sprockets and a chain connecting all of said sprockets, of a housing inclosing said chain and sprockets and having a portion for preventing disengagement of the chain from the driving sprocket, and means engageable with another portion of said housing for locking the chain to one of the driven sprockets, whereby the timed relation between said sprocket and the driving sprocket is maintained when the other driven sprocket is removed.

3. The combination with a drive sprocket, a plurality of driven sprockets and a chain for connecting all of said sprockets, of a housing for inclosing said chain and sprockets and providing clearance for the disengagement of the chain from the driven sprockets and having its clearance restricted adjacent to the driving sprocket to prevent disengagement of the chain therefrom, and a set-screw engageable with a threaded aperture in said housing for clamping the chain to one of said driven sprockets.

In testimony whereof I affix my signature.

IVAN ORNBERG.